(12) United States Patent
Rogers et al.

(10) Patent No.: US 11,002,091 B2
(45) Date of Patent: *May 11, 2021

(54) POWER TONG POSITIONER

(71) Applicant: Rogers Oil Tools, LLC, Abbeville, LA (US)

(72) Inventors: Tommie L. Rogers, Lafayette, LA (US); John William Trahan, Lafayette, LA (US)

(73) Assignee: ROGERS OIL TOOLS, LLC, Abbeville, LA (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/362,937

(22) Filed: Mar. 25, 2019

(65) Prior Publication Data

US 2019/0218867 A1 Jul. 18, 2019

Related U.S. Application Data

(63) Continuation of application No. 15/432,955, filed on Feb. 15, 2017, now Pat. No. 10,240,409.

(60) Provisional application No. 62/362,879, filed on Jul. 15, 2016.

(51) Int. Cl.
*E21B 19/16* (2006.01)
*G01V 3/28* (2006.01)
*E21B 17/042* (2006.01)

(52) U.S. Cl.
CPC .......... *E21B 19/161* (2013.01); *E21B 19/165* (2013.01); *G01V 3/28* (2013.01); *E21B 17/042* (2013.01)

(58) Field of Classification Search
CPC .... E21B 19/161; E21B 19/164; E21B 19/166; G01L 5/0042; G01L 5/24; G01V 3/28
See application file for complete search history.

(56) References Cited

U.S. PATENT DOCUMENTS 10,240,409 B2 * 3/2019 Rogers .................. E21B 19/161

* cited by examiner

*Primary Examiner* — David B. Thomas
(74) *Attorney, Agent, or Firm* — Law Office of Jesse D. Lambert, LLC

(57) ABSTRACT

A power tong positioner has one or more eddy current probes mounted in association with a power tong/backup unit. An electric current runs through the probe, and with the probe positioned close to a tubular connection, movement of the probe along the length of the connection, with the electric field encompassing surface features on the tubular, will cause a change in the electrical impedance (conductivity) which enable identification of the connection seam or other defined attributes (the "target" attributes). The power tong/backup unit can be positioned accordingly. A portfolio of profiles of non-connection seam surface features of different tubular connections may be generated, stored in a database, and accessed by the system, which enables identifying the connection seam/face with greater accuracy. Other attributes of the invention include storing profile information on RFID tags, and storing and accessing tubular information from a cloud server or other form of remote database.

2 Claims, 18 Drawing Sheets

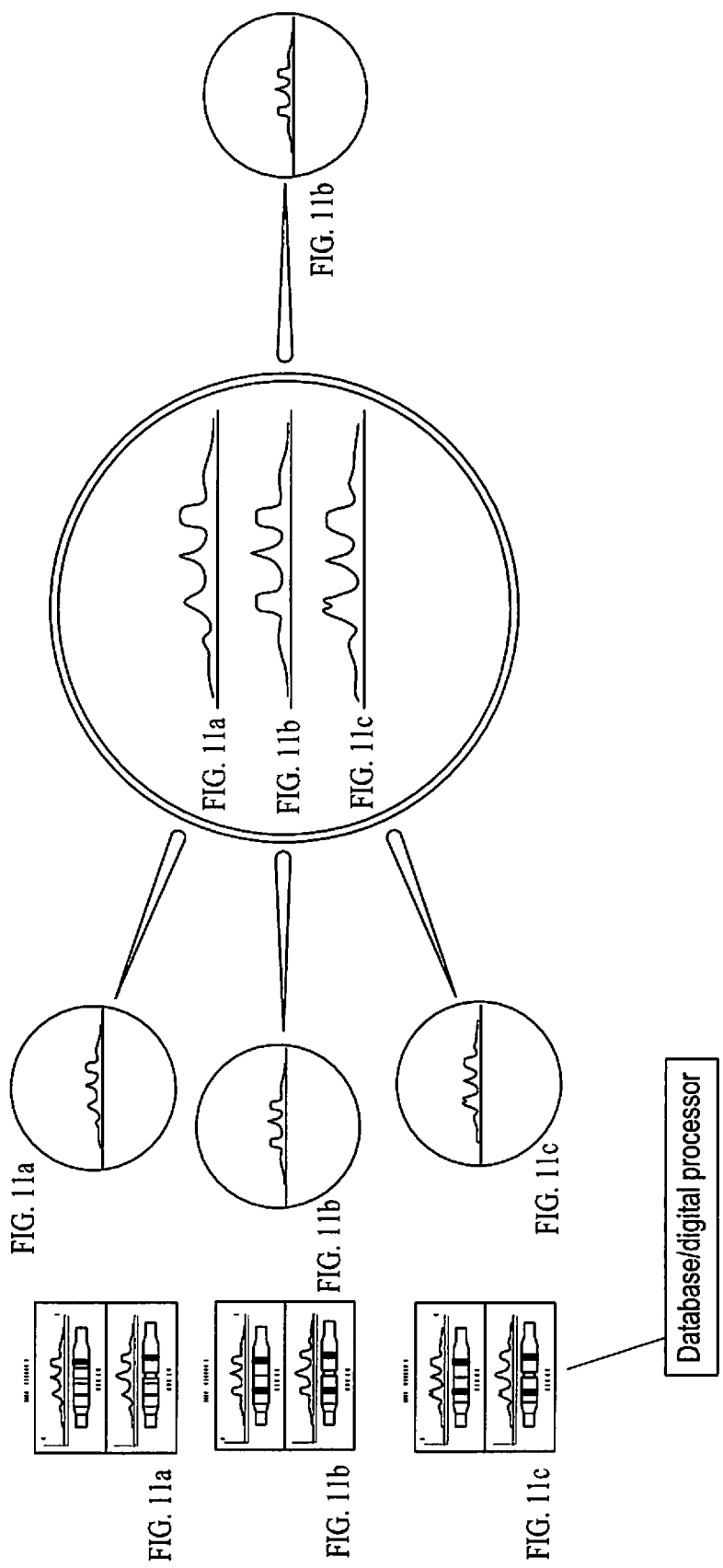

POWER TONG POSITIONER

CROSS REFERENCE TO RELATED APPLICATIONS

This United States patent application is a continuation of Ser. No. 15/432,955, and further claims priority to U.S. provisional patent application Ser. No. 62/362,879, filed Jul. 15, 2016, for all purposes. The disclosure of that provisional application is incorporated herein by reference, to the extent not inconsistent with this disclosure.

BACKGROUND—FIELD OF THE INVENTION

This invention relates to apparatus, and method(s) of use of same, in connection with the positioning of a power tong unit about a threaded tubular connection.

As is known in the art, tubular strings comprised of "joints" of tubulars, for example drill pipe, are often joined by threaded connections. Such tubulars are frequently, but not exclusively, used in connection with the drilling and servicing of oil and gas wells. By way of example, much of the following description will be in the context of drill pipe, used in the drilling and servicing of oil and gas wells, which has threaded "tool joints" connecting the joints (sections) of drill pipe. A typical tool joint comprises an upset or larger diameter section at either end of the main body or "tube" of the joint of drill pipe. The female connection is frequently referred to as the "box," and the male as the "pin."

When the drill pipe is being run into a wellbore, or pulled from a wellbore, a power tong and backup unit is positioned around the threaded connection to screw together ("make up") or unscrew ("break out") the connection. The backup grips the box or lower tool joint, while the power tong grips and rotates the pin or upper tool joint.

Therefore, the vertical positioning of the power tong/backup unit is critical. While some leeway is available, it is readily understood that the unit must be positioned with reasonable accuracy with the power tong unit on one side of the "connection seam," that is, where the faces of the pin and box tool joints meet; and the backup on the other side of the connection seam.

While the power tong/backup unit can be positioned by a human operator, for safety reasons and the ability to work in conjunction with automated systems it is preferred that some sort of remote positioning system be employed. One such system is disclosed in U.S. Pat. No. 6,965,230, owned by the Applicant of the present application. That system employs "eddy current" technology to sense the location of the connection seam via a magnetic eddy current. The connection seam is detected as an anomaly in the pipe surface; the system detects the vertical position of the connection seam, and positions the power tong/backup unit accordingly. Various anomalies in the pipe surface (other than the connection seam; for example, corrosion, tong marks, hard banding, etc.), and other factors, can affect the accuracy of the system.

SUMMARY OF THE INVENTION

A system embodying the principles of the present invention comprises a magnetic eddy current generating system, with an eddy current detector or probe, which preferably utilizes a differential winding to increase the accuracy of the eddy current detection. The eddy current detection system can produce an output or record, or "pipe profile," corresponding to the strength (and other characteristics) of the detected eddy current, as the probe is moved vertically (or longitudinally) along a tool joint. A pipe profile can therefore be generated, either in a shop environment or in the field (e.g. on the drilling rig) for various tool joint configurations which may be encountered.

The present invention may comprise what in essence is a hierarchy of evaluation, culminating with identification of the desired attribute, i.e. the connection seam. The system can move from a very general consideration (e.g. encompassing all connections of a given pipe size); to a more specific consideration (e.g. a particular threaded connection); to an even more particularized consideration (e.g. a particular threaded connection as in use on a particular drilling rig).

Generally, the pipe profile reflects the nominal outer diameter of the tool joint; and various manufactured surface features such as hard banding, identification grooves, etc.; possibly the exposed portion of pin threads of a tool joint; and certain surface features such as pitting, corrosion, rust, scale, etc., depending upon the sensitivity of the system. These attributes of the pipe profile may be considered as "non-target" profile attributes.

A connection seam created at the junction of the connection faces of two stabbed-together tool joints is yet another profile feature, among the other profile features. The connection seam may be considered as the "target" profile attribute. By reference to a generally known pipe profile, and by filtering out or suppressing certain aspects of the known pipe profile (the non-targets profile attributes), the system is capable of identifying and distinguishing the connection seam (the target profile attribute) from among the other non-target profile attributes with greater accuracy.

Another embodiment of the present invention comprises a means for reading an information tag, for example a Radio Frequency Identification or RFID tag, affixed to the tubular, namely to the tool joint, which contains information related to the dimensions and other aspects of the tubular connection. Such information may be of use in determining the distance between the information tag (or some other readily detectable reference point on the tool joint) and the connection face or connection seam. Such information may also be used in certain embodiments of the present system which monitor overall use of a drill string, including particular joints of pipe used on the rig, how their dimensions change over time, etc. In addition to or in lieu of the RFID tag, a "marker" could be employed on the tubular connection, e.g. any material which provides a significant difference in conductivity, as compared to the base pipe material. This could be, e.g., a ring of stainless steel embedded in the box side of the tool joint connection. It is understood that other materials could be used as well. The marker is disposed at a known distance from the connection face, hence detection of the marker location yields a clearly identified dimensional reference point from which the power/tong backup unit can be positioned.

BRIEF DESCRIPTION OF THE DRAWINGS

FIGS. 11a-11c illustrate one embodiment of the pipe profile selection process.

DESCRIPTION OF THE PRESENTLY PREFERRED EMBODIMENT(S)

While various power tong positioning systems can embody the principles of the present invention, with reference to the drawings some of the presently preferred embodiments can be described.

Figure 1:
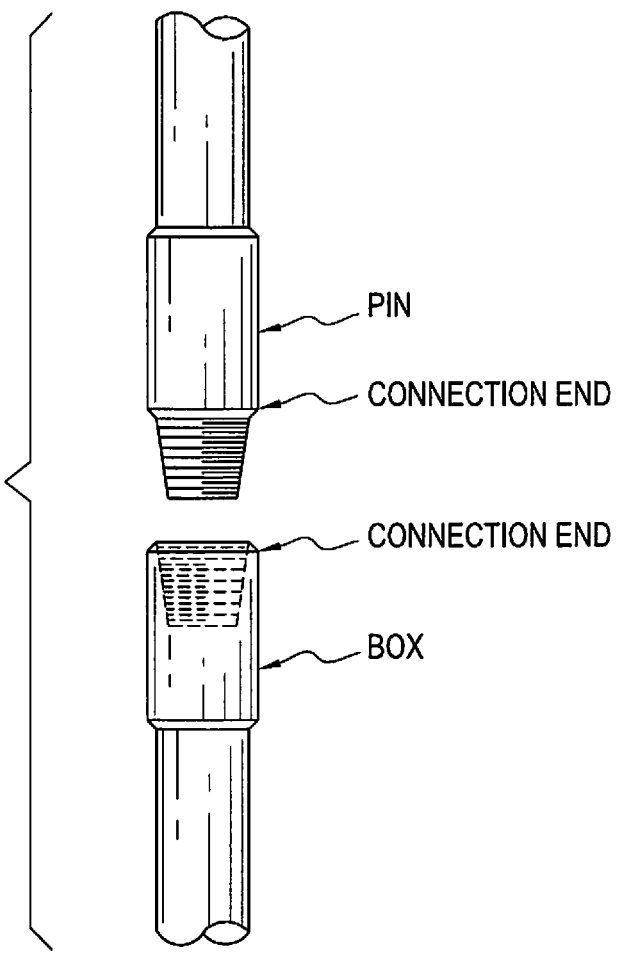
FIG. 1 is a view a typical threaded tubular connection, not yet screwed together, showing the male or "pin" end and the female or "box" end.
Figure 2:
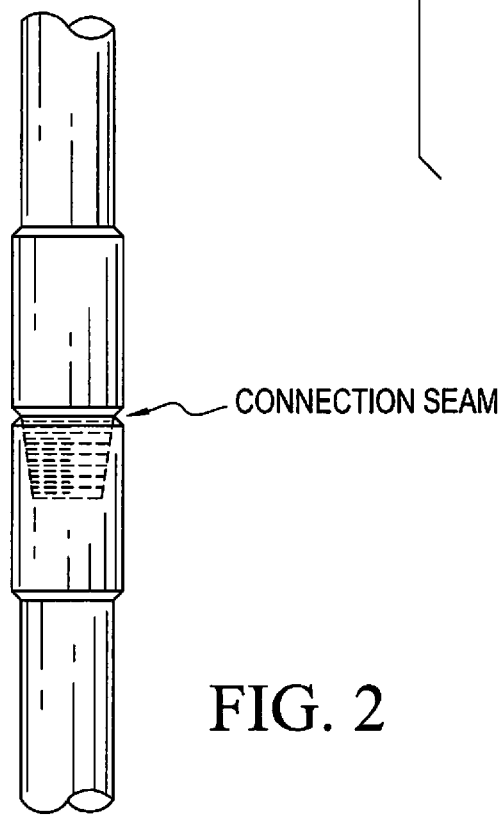
FIG. 2 shows the pin and box connections of FIG. 1 screwed together or "made up," with a resulting "connection seam" being formed.

FIGS. 1 and 2 show a threaded tubular connection, which may be referred to at times as a "tool joint," both in an unscrewed position (FIG. 1) and a screwed-together or "made up" position, FIG. 2. As is known in the art, various parts of the overall connection are shown and labeled, including the male or "pin" connection half, with its own connection end or connection face (namely, the shoulder at the base of the threads); and the female or "box" connection half, with its own connection end (namely, the outward facing face of the box). As in FIG. 2, when the pin and box are screwed together or "made up," the connection ends or faces meet forming a connection seam.

Power Tong/Backup Unit, Power Positioner

Figure 3:
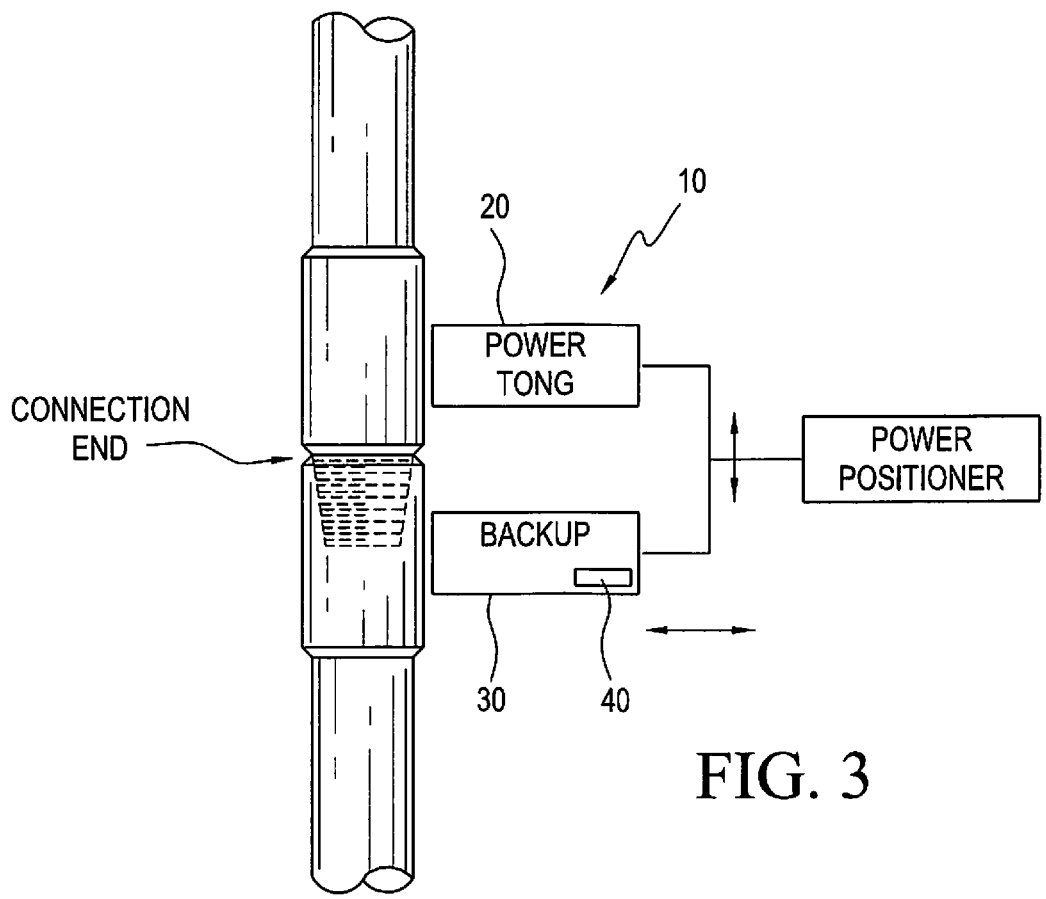
FIG. 3 is a view of an exemplary power tong and backup unit, coupled to a power positioner, in position adjacent a connection.

FIGS. 1-3 illustrate a common setting for employment of the method and apparatus in a rig setting, in which the tubular is disposed substantially vertically (that is, the longitude of the tubular is vertical), typically in the rotary of a drilling or workover rig. A power tong unit 10 must be vertically positioned, as shown in FIG. 3, with the power tong 20 (the part which rotates the tubular) on one side (either above or below) of the connection seam, and the backup 30 (the part which holds the other side of the connection, either stationary or rotates it in a direction opposite to the direction of rotation of the power tong) on the other side, so that relative rotation of the two may be effected. While FIG. 3 shows power tong 20 placed above the connection seam (to grip and rotate the upper half of the threaded connection, typically the pin), with backup 30 placed below the connection seam, it is to be understood that the positions could be reversed. It can be readily appreciated that the connection end is the relevant positional reference point for proper positioning of a power tong unit.

It is to be understood that although this description focuses on use of the present invention in situations wherein the tubular is held substantially vertically, such as when positioned in slips in the rotary of a drilling rig and connections are being made therein, it may be used with equal utility with the tubular in any other orientation. For example, the present invention may be used in a shop environment, where the tubular is positioned horizontally; and may also be used in situations wherein the tubular is in an inclined position, e.g. with tubulars in a mousehole on the rig floor, in the V-door of a rig, a pipe laydown unit, etc.

The apparatus and method of this embodiment of the invention detects the vertical position of the threaded connection end or connection seam, and preferably sends a signal to a positioning unit when the connection end is detected to position the power tong/backup unit properly about the connection seam. Preferably, the signal is supplied to a processor (see FIG. 6) which automatically controls a power positioner to longitudinally position the power tong unit properly about the two halves of the threaded connection, about the connection seam, or on the one half (usually the box) of the connection. The basic physical principle which the apparatus and method employs is so-called "eddy current" detection of discontinuities in an electrically conducting object, as earlier described herein. For purposes of this invention, the eddy current principle is used to detect a "discontinuity" in electrically conductive tubular goods, which may take the form of the connection seam (the connection seam, with respect to the tubular on either side of it, being a discontinuity, in that the seam marks where two separate pieces of metal meet) or the connection end (with the absence of metal beyond the end being the discontinuity). As described in more detail herein, the present invention is capable of detecting non-target pipe profile attributes, and distinguishing same from target attributes, while at the same time utilizing the non-target attributes to assist in locating the target attributes. It is to be understood that any attribute of the tubular which can be distinguished by the system may be regarded as the target attribute; for example, the "flat" sections of a tool joint adjacent the connection face (these flat sections being the locations where the power tongs and backup dies "bite" or grip or engage the tubular) may be regarded as the target attributes. In other embodiments, the marker discussed later herein may be regarded as the target attribute.

Various modifications to the apparatus and its method of operation may be made in order to optimize discontinuity detection for differing configurations of tubulars, material type, etc. The scope of the present invention encompasses any such methods and apparatus of using eddy current principles to detect the location of non-target attributes as well as a connection end, for purposes of vertical, horizontal, or other positioning of a power tong/backup on the connection.

Figure 4:
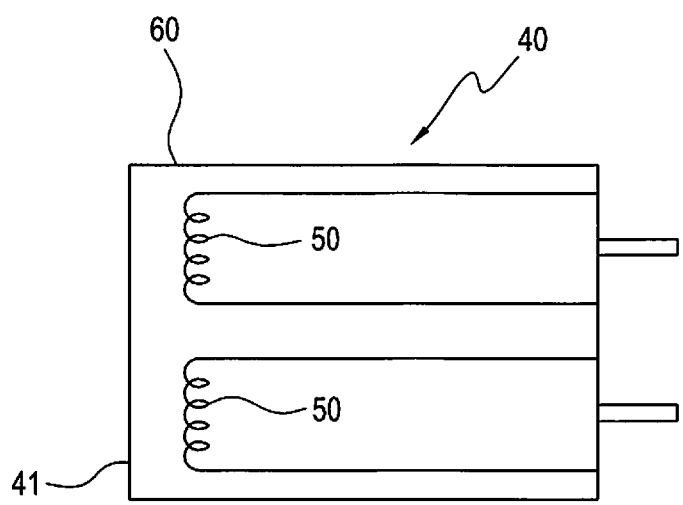
FIG. 4 is a schematic representation of one embodiment of the probe of the present invention, comprising two electric coils in an elongated housing. It is understood that in a presently preferred embodiment of the present invention, the probe comprises a "differential" winding coil, with different numbers of windings in different sections of the probe.

As shown in FIGS. 3-6, the invention preferably comprises a probe 40 comprising at least one electric coil 50 mounted in a housing 60. FIG. 4 is a schematical exemplary drawing of probe 40, in partial cross section, and shows a presently preferred embodiment comprising two coils 50. It is to be understood that FIG. 4 is schematical in nature, and the actual physical configuration of the coils and their placement in the housing may take a number of forms, as is known to those having skill in the relevant art field; the scope of the present invention encompasses any number and configuration (size, geometry, etc.) of coils. Preferably, probe 40 comprises a "differential" probe, which has multiple eddy current coils or detectors spaced apart from one another, and the accompany software and processor uses information from the differential coils to detect, with greater accuracy, the location of a connection seam, another target attribute, and the overall profile of the tubular. Preferably, the coils are differentially wound, with different numbers of windings on different sections of the coil.

In a preferred embodiment, probe 40 is mounted on a power tong unit 10, for example probe 40 being mounted on backup 30. The probe face 41 may be positioned at or close to the edge of the throat 15 of power tong unit 10. That distance may of course be modified to accommodate particular operating conditions. It is to be understood, however, that the scope of the present invention includes embodiments where the coil is carried by apparatus other than the power tong unit, for example some arrangement of movable carrier dedicated to the probe positioning function.

Figure 5:
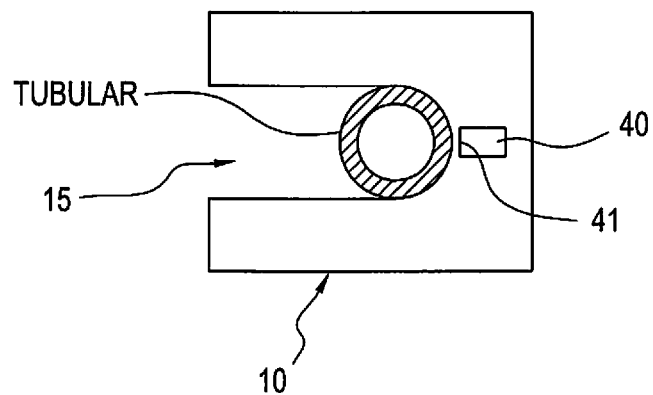
FIG. 5 is a top view of one embodiment of the present invention, showing the probe mounted on the power tong unit, and a tubular in position within the throat of the power tong unit.

FIG. 5 is a top view of probe 40 positioned in power tong unit 10. FIG. 5 also shows a tubular (in cross section) in position within the throat of power tong unit 10, for example against the rearward surface of the throat, and thereby positioned sufficiently close to probe face 41 to be within the magnetic field emanating therefrom, as later described.

Figure 6:
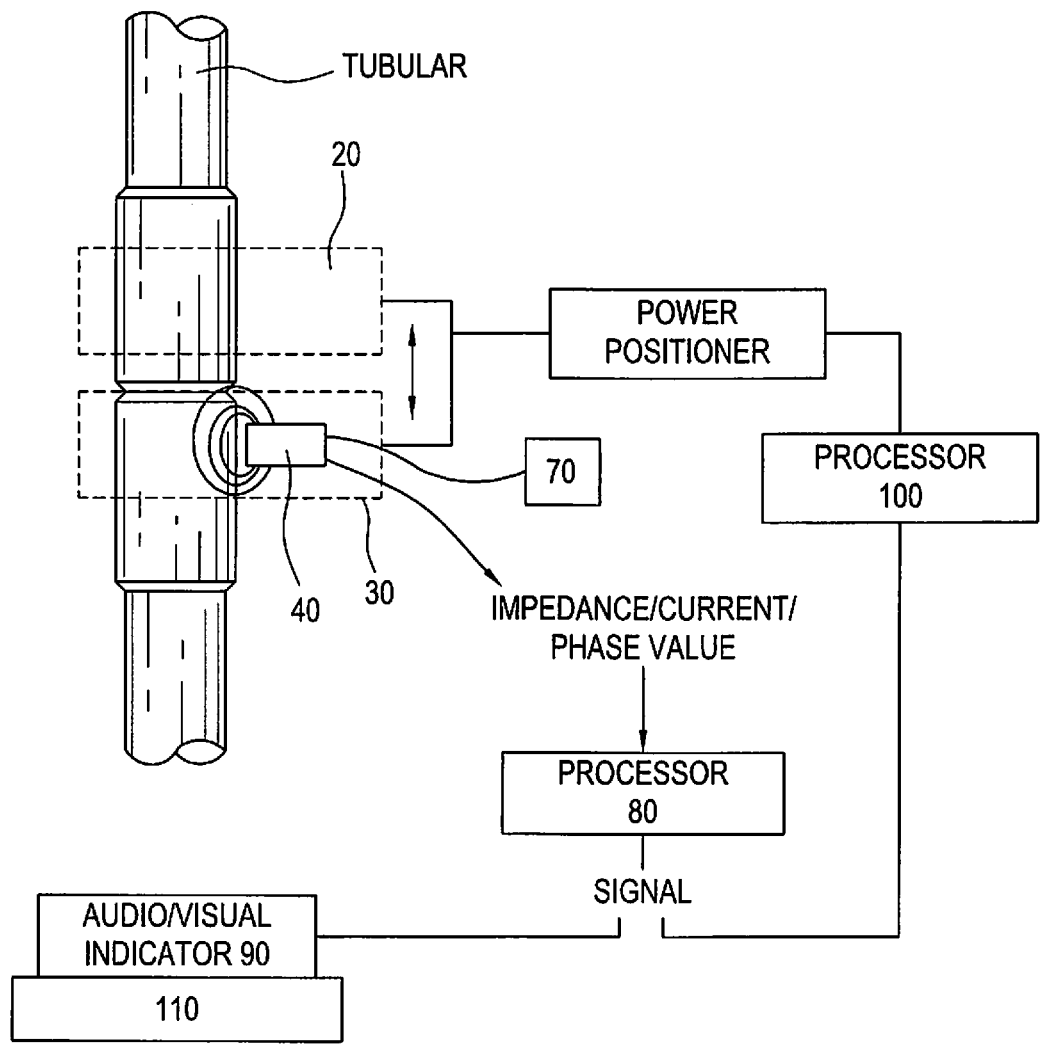
FIG. 6 shows an exemplary power tong and backup unit, coupled to a power positioner, and also showing coupling to one or more digital processors which receive data from the eddy current measurement apparatus, process same to identify the location of the connection seam/connection face, in addition to other possible attributes, and signal the power positioner to position the power tong/backup unit accordingly.

FIG. 6 shows an exemplary arrangement of the apparatus of the present invention. An electric current source 70, preferably a radio frequency alternating electric current source, supplies a radio frequency electric current to probe 40. It is to be understood that although the presently preferred embodiment employs an alternating current, other embodiments within the scope of the present invention may employ a direct current. As is later described, a means for detecting a change in the electro-magnetic field of coil 50 as it moves along the longitude of the tubular is provided, which can comprise a first processor 80 measuring impedance, current, and phase angle for the electric current flow through the electric coil(s). A means for moving electric coil 50 parallel to the longitude of the tubular can comprise power tong unit 10 moved by the power positioner. Processor 80 may be coupled to an indicator 90, which may have audio and/or visual output, or any other type of signal (whether to signal a human operator or other equipment) when a change indicative of a connection end (or any other target attribute) is detected; preferably, processor 80 is coupled to a second processor 90, in turn coupled to the power positioner, which positions power tong unit 10 both horizontally and vertically (along the longitude of the tubular).

It is to be understood that the present invention detects and evaluates not any single attribute of the connection, but instead detects and considers the overall profile of the connection, in essence considering an overall mosaic of tubular attributes.

Indicator 90 is typically mounted on a control console 110, which also typically contains manual controls for the power positioner as well as for power tong unit 10 (e.g., the throat door, rotary, etc. of the power tong and backup). It is understood that the system comprises appropriate software, controls, digital processors, etc. to enable proper functioning of the detection and positioning components and other elements of the system. Depending upon the distances involved in a particular setup (namely, the distance from the probe to other components of the system), a pre-amplifier and attenuator may be used to boost the signal, e.g. in cable runs longer than 30 meters.

Fundamental to operation of the present invention is that the coil (probe) produces an alternating magnetic field in the material (namely, the tubular) that generates eddy currents which flow on the surface of the material in a circular pattern. The eddy currents in the tubular material produce an alternating magnetic field that opposes the induced magnetic field (from the probe). The system monitors the impedance changes in the coil (probe) and show the impedance changes (due to both non-target attributes and target attributes) graphically on the screen or on any other suitable output device. Generally, the deflection on the screen is proportional to the depth of the change in surface profile (whether for target or non-target attributes).

Improved Eddy Current Probe (Detector)

The preferred embodiment of the present invention employs an eddy current probe 40 which is a "differential winding" or "differential" probe, one embodiment of which has multiple sections of different numbers of windings on a single coil (e.g. 3 windings on one section, 5 windings on another section), or having multiple probes, which (effectively) uses multiple emission/detection locations to improve the sensitivity of the change in conductivity detection; or alternatively, effectively multiple, separated coils. Eddy current probe 40 is adapted for use in the relevant environment, namely on the drill floor of a drilling rig, shop, or any other environment.

Figure 6A:
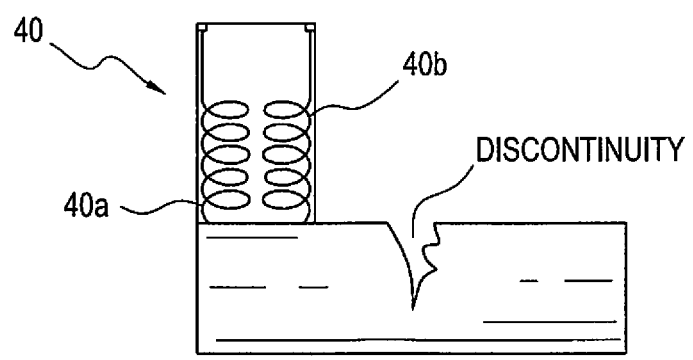
FIG. 6A is a schematic of a differential probe.

One differential eddy current probe 40, in schematic form, is shown in FIG. 6A. A differential probe may have multiple active coils wound in opposition (that is, creating opposing magnetic field directions), or wound in addition. As is known in the relevant art, with a differential probe having multiple separated coils (e.g. 40a and 40b), when one coil is positioned over an area of the pipe not having any discontinuity, and the other coil is positioned over an area of the pipe having a discontinuity, then a differential signal is produced.

It is to be understood that although various embodiments of differential probes may be advantageously used in the present system, they are not required, and an "absolute" probe may be used as well.

As is known in the relevant art, apparatus in this setting must be sealed to prevent damage from fluids, must be rugged to withstand strikes by other equipment, and must be intrinsically safe (explosion proof). It is understood, however, that the apparatus could be used in other environments, e.g. a plant, manufacturing facility, etc.

Creation of Pipe/Tubular Connection Eddy Current Profiles

An aspect of the present invention is the creation or development of a plurality of eddy current profiles, reflecting eddy current response for a number of pipe/tool joint/connection seam combinations. Preferably, although not exclusively, such profiles are scanned in a shop-type or similar controlled environment and stored in a database, but the scope of the present invention encompasses the creation and storage of such profiles in the field, as well.

Figure 7A:
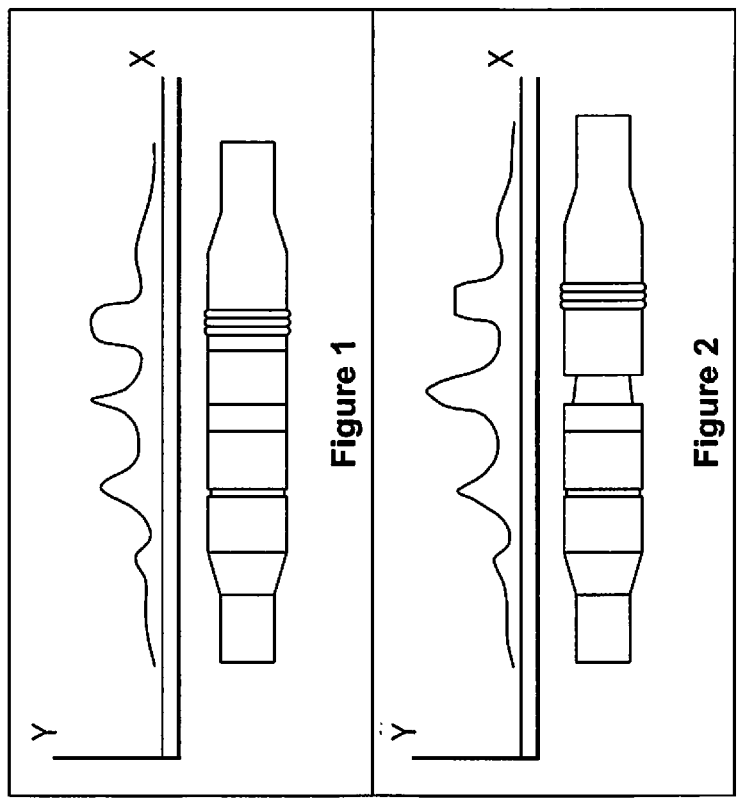
FIGS. 7a-7c show three exemplary threaded connections (tool joints), each having different physical characteristics which result in different pipe profiles. Each tool joint is shown in a screwed-together ("made up") configuration, top; and an unscrewed ("broken out") configuration, bottom.
Figure 7B:
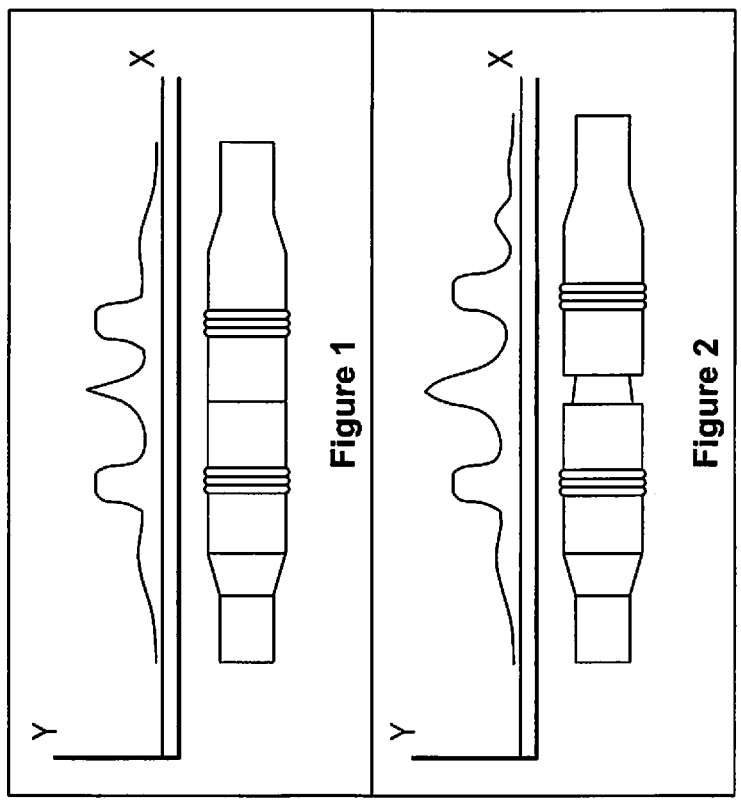
Figure 7C:
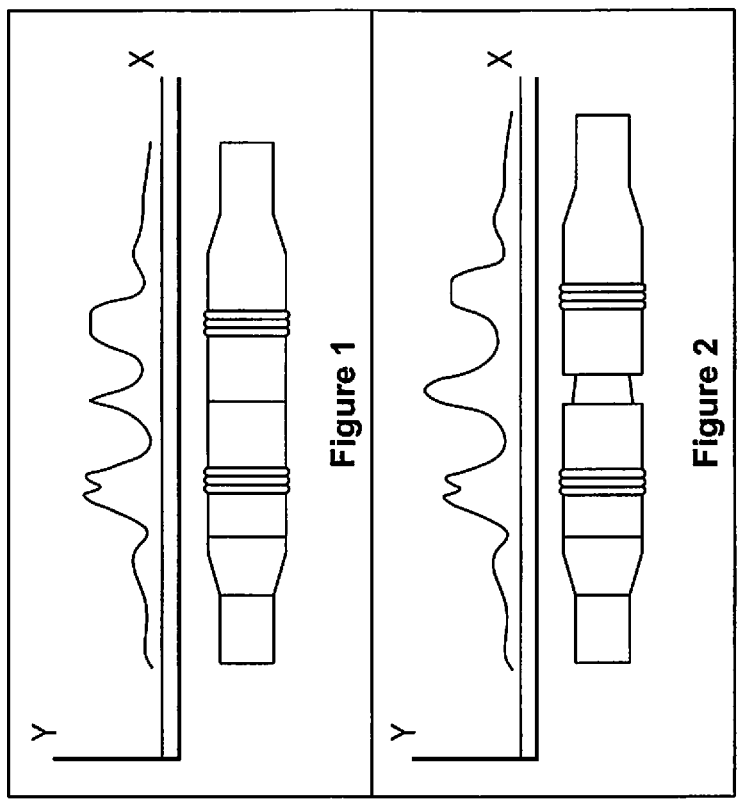

FIGS. 7a-7c show a number of example profiles for three different tubular connections. It is understood that different tubular connections will or may have different shapes, namely the length of tool joint upsets and other attributes; and may also have such characteristics as identification grooves, hardbanding, etc. which all show up on the profile. As previously described, such attributes comprise "non-target" attributes or characteristics. These non-target characteristics are in addition to the actual connection seam, which may be the target attribute or characteristic. It is to be understood that other attributes of the tubular profile may be regarded as the target attribute(s).

Referring to FIGS. 7a-7c, Pipe Samples 1, 2 and 3 are shown, in both a screwed-together or "made up" configuration (the top drawings) and an unscrewed or "broken out" configuration (the top drawings). The connections in the three pipe samples each have different identification groove, hard banding, etc. attributes.

Figure 8A:
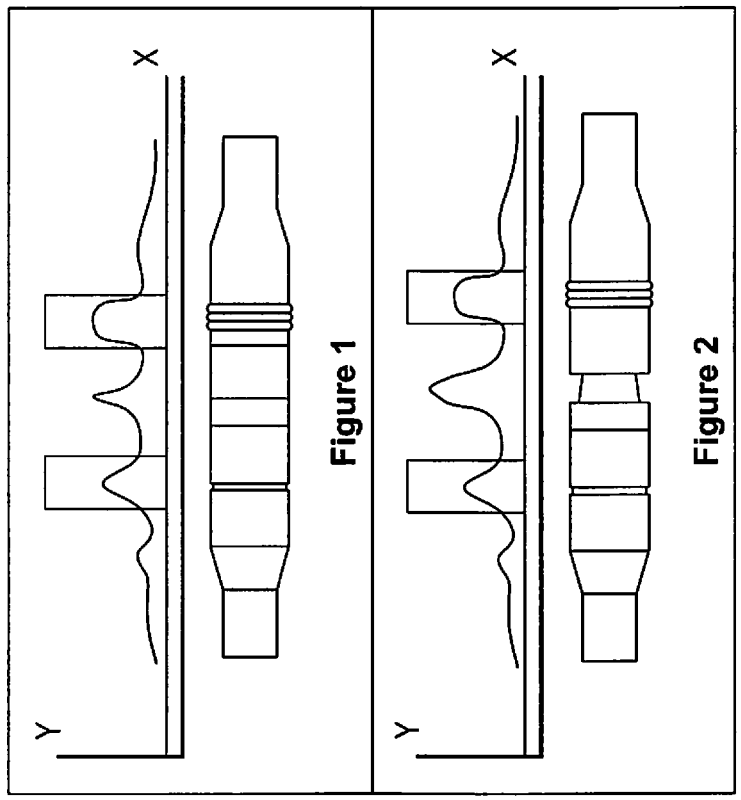
FIGS. 8a-8c show the three exemplary threaded connections, in the same configurations as FIGS. 7a-7c, with the pipe profiles (namely, the eddy current signatures) shown above each connection.
Figure 8B:
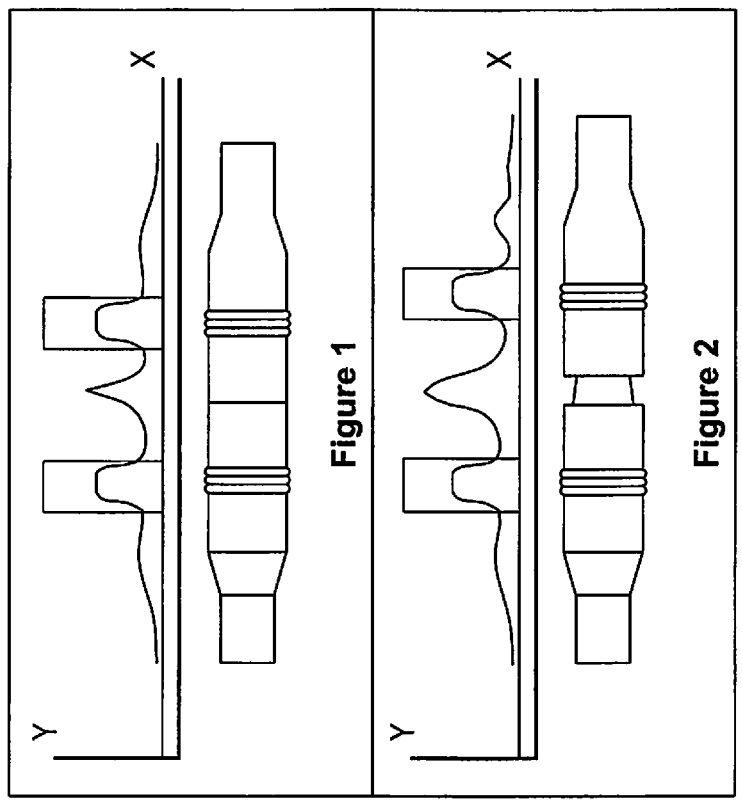
Figure 8C:
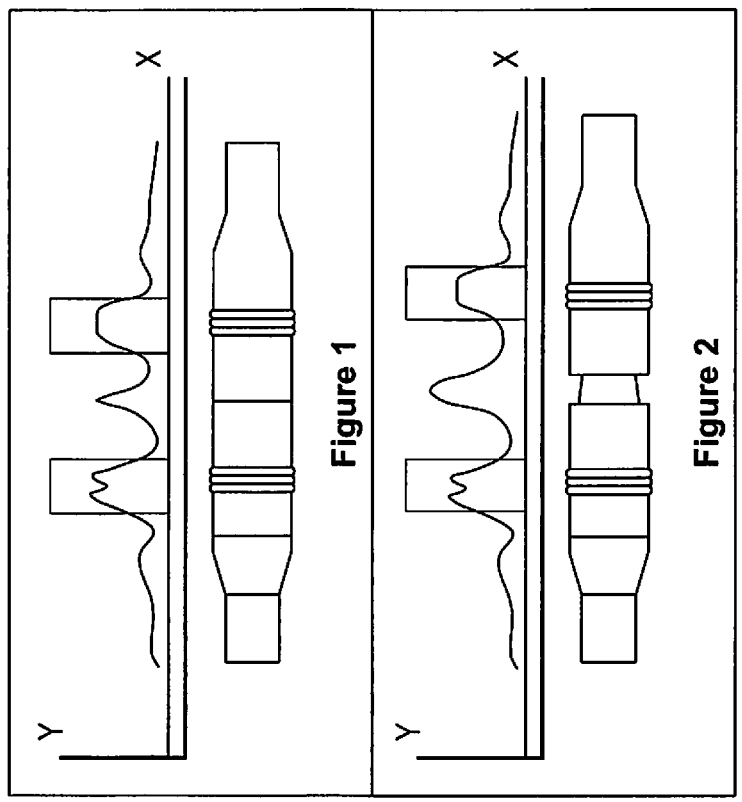

FIGS. 8a-8c show the same three pipe samples, in the made up and broken out configurations, with the measured eddy current profiles shown. It can be seen that the various physical attributes of the tubulars result in different eddy current profiles. It can be further understood that the eddy current profiles are a largely unique "signature" for each tubular connection or family of connections. The evaluation may be considered a three level hierarchy, by way of example (1) 5" drill pipe in general; (2) next, 5" drill pipe with a particular connection, hardbanding, identification groove, etc.; (3) next, a particular joint of 5" drill pipe, with the totality of its individual attributes.

Figure 9A:
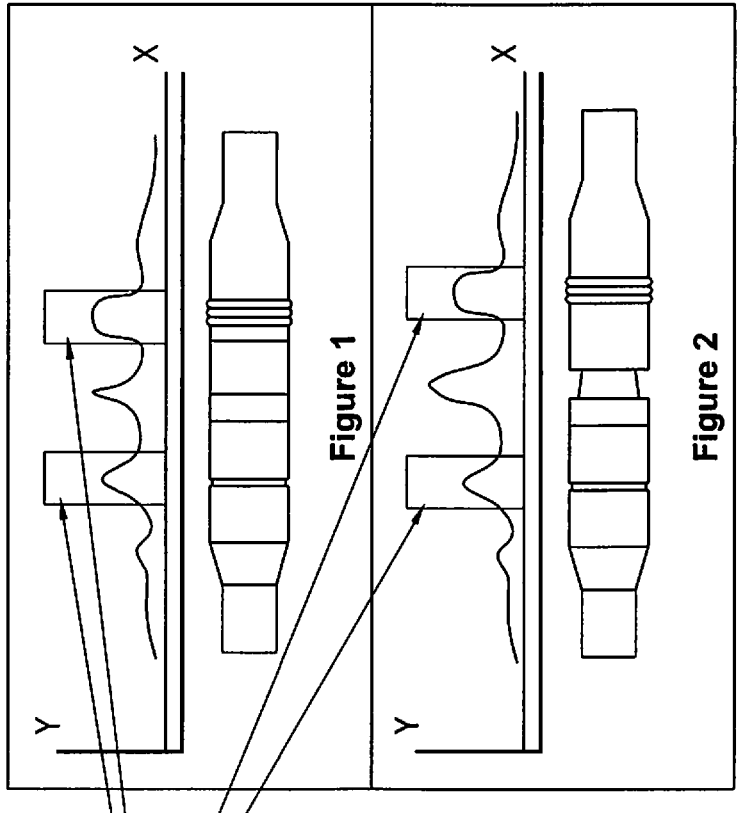
FIGS. 9a-9c show the three exemplary threaded connections and pipe profiles as above, with certain portions of the pipe profiles (non-target attributes) highlighted to illustrate the portions of the pipe profiles which may be distinguished from target attributes.
Figure 9B:
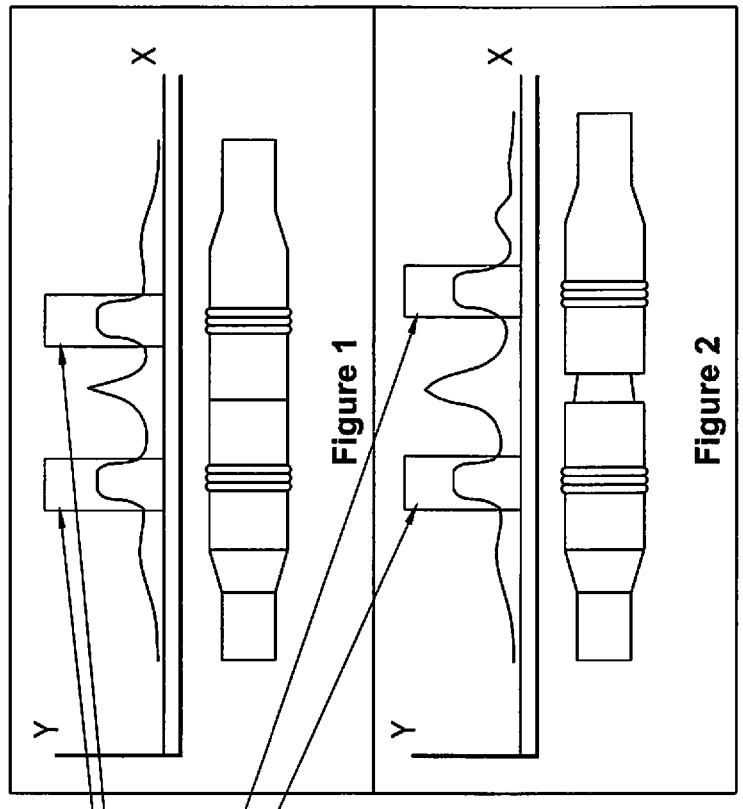
Figure 9C:
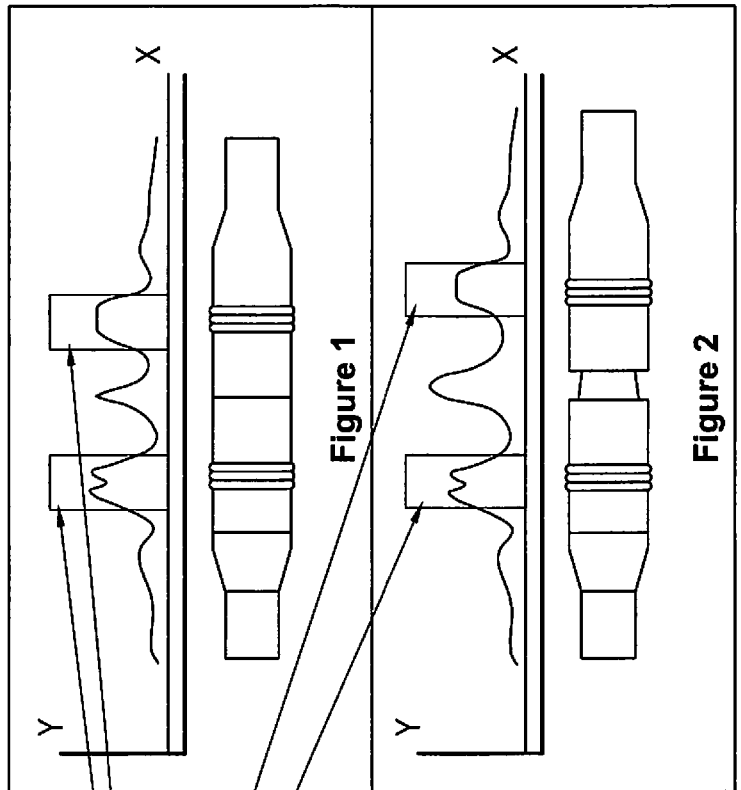

FIGS. 9a-9c further show an important aspect of the present invention. As can be seen in those figures, eddy current profile attributes other than those from the connection seam, namely the non-target attributes, are enclosed in rectangles. Such profile attributes can be identified and (in essence) screened out of the overall eddy current profile, and used to assist in determining which of the attributes of the overall eddy current profile actually correspond to the connection seam (which in this case is the target attribute). As previously mentioned, other tubular profile attributes, for example the box and pin flats where the tong dies grip the tubular, may also be regarded as target attributes.

Figure 10A:
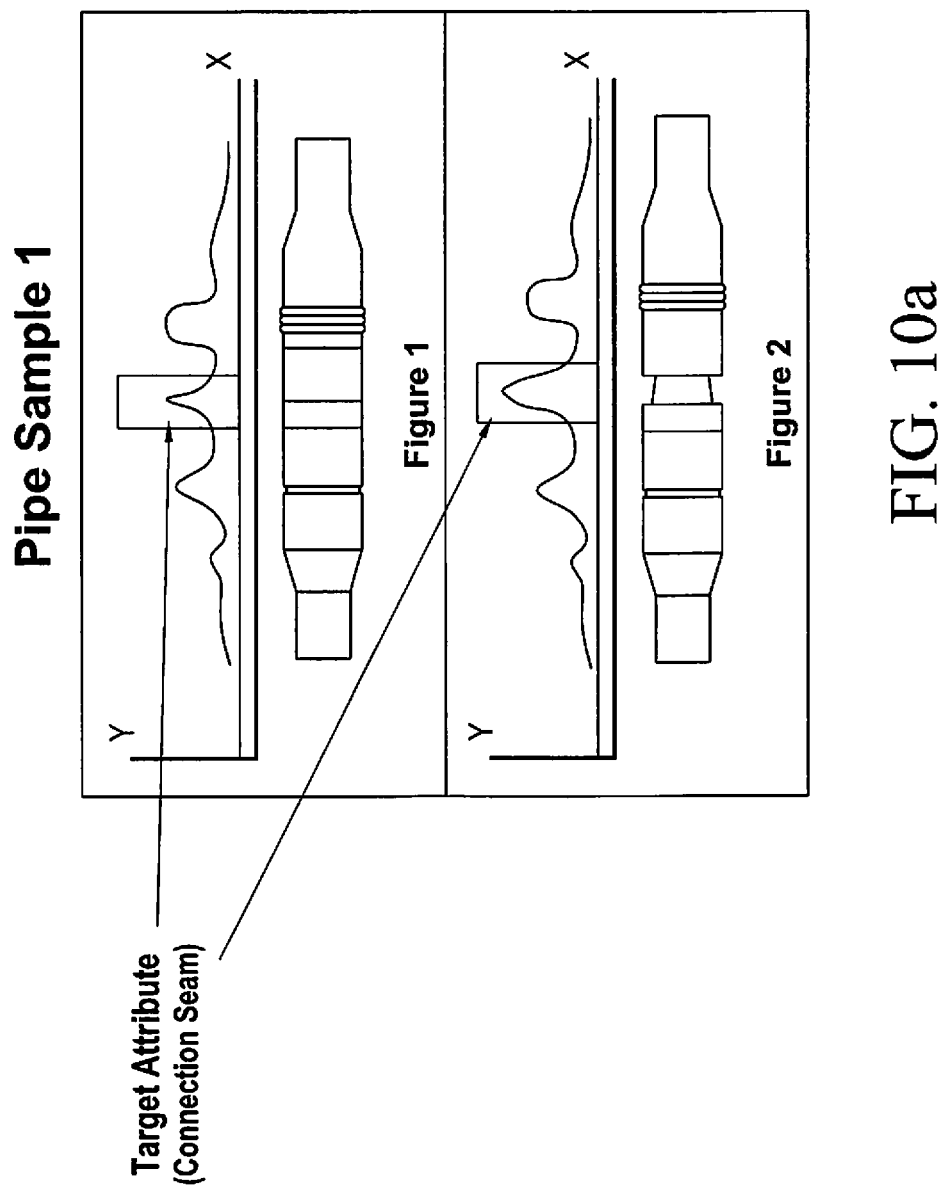
FIGS. 10a-10c show the three exemplary threaded connections and pipe profiles as above, with certain portions of the pipe profiles highlighted to identify the portion of the pipe profile that is the connection seam.
Figure 10B:
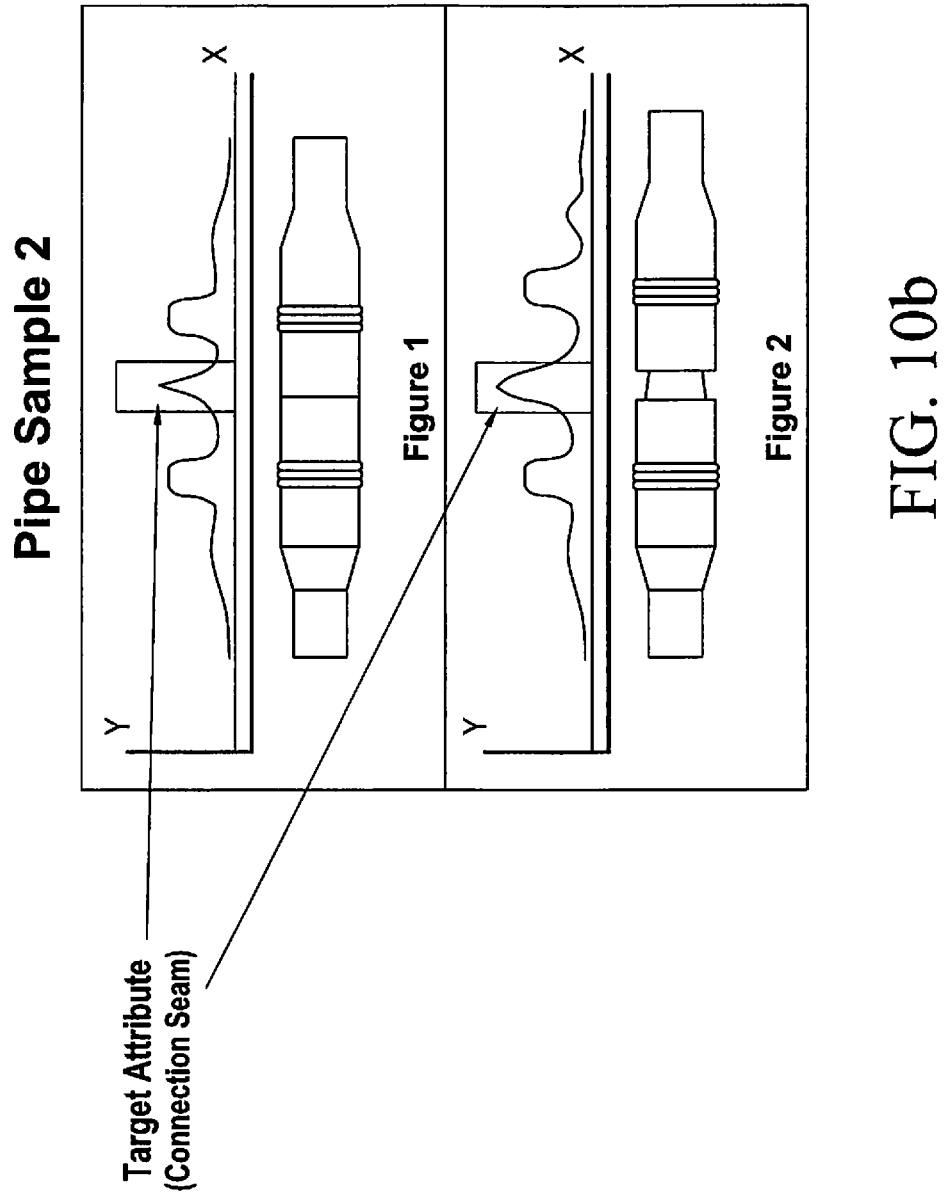
Figure 10C:
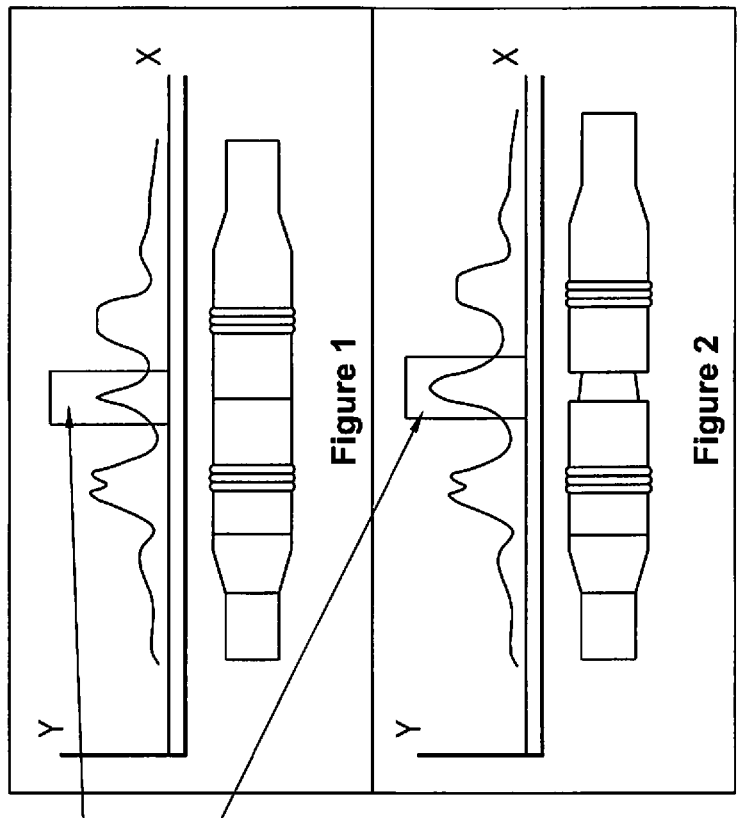

In FIGS. 10a-10c, eddy current profile attributes for the connection seam itself, the target attribute, are enclosed in rectangles.

It is the ability of the system of the present invention to differentiate between the non-target profile attributes (i.e. everything but the target attribute, which may be the connection seam or some other attribute), and the target profile attribute (i.e. the connection seam attribute), that is of key importance herein. In effect, the non-target attributes comprise "false positive" readings to distinguish from the target attributes.

Utilization of Tubular Profiles in Detection of Connection Seam (or Other Target Attribute(s))

In field applications, the detection system of the present invention may be programmed and calibrated so as to differentiate non-target eddy current profile attributes, and use such non-target profile attributes to assist in identifying the target eddy current profile attributes.

With reference to FIGS. 9a-10c, an exemplary sequence of detection and identification can be described.

Using Pipe Sample 1 as an example, it can be seen that a readily recognizable square-topped peak is generated by the hard banding on the box connection; see annotation on the drawing. The pin side of the connection further has a well defined sharper pointed peak, also seen, corresponding to a identification groove. This eddy current profile information will be acquired and entered into the system, preferably (although not exclusively) in advance of actual field work. Preferably, a library or portfolio or database of the pipe profiles of a number of commonly used connections is created in advance of field operations.

When the positioning system is thereafter deployed utilizing a type of pipe within the portfolio, for example the type of pipe of Pipe Sample 1, then the system will be programmed to seek and identify an eddy current attribute positioned between the eddy current attribute of the box side of the connection (namely, the hard banding) and the pin side of the connection (namely, the identification groove). It can be readily understood that the ability to identify the known eddy current profile attributes of the box and pin sides of the connection, while differentiating certain "false positive" or non-target attributes, greatly increase the system's ability to identify the connection seam attribute or any other target attribute.

FIGS. 11a-11c illustrate one possible pipe profile selection process, in which three different profiles are input to arrive at the one profile in question.

Further, the system comprises the detection means to differentiate non-target eddy current profile attributes such as rust, scale, pitting, etc.

It is understood that on-the-job pipe profiles can be obtained for connections not existing within the portfolio, and that adjustments and corrections can be made on the job to accommodate changes in connection attributes.

Figure 12:
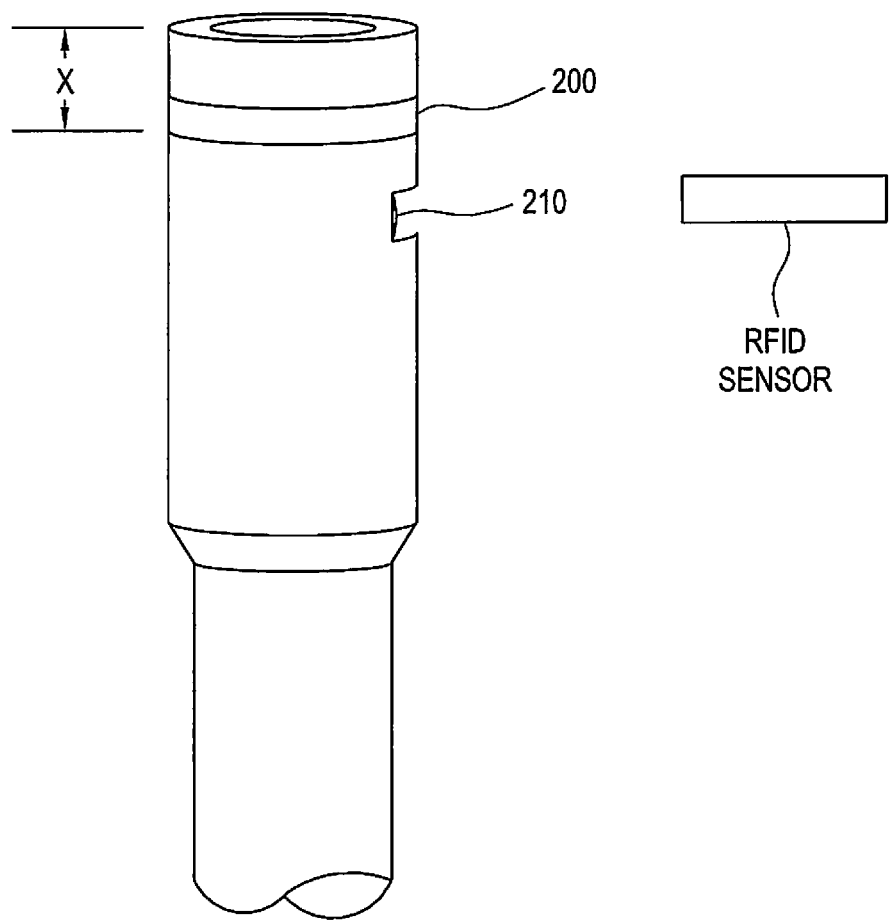
FIG. 12 is a schematic of a tubular comprising a marker and an RFID tag.

Further, the present invention encompasses several operating modes for selection of proper pipe profiles, as follows:
(1) Manual selection of appropriate pipe profile: the operator inputs appropriate pipe profile data, or selects a pipe profile from a portfolio or family of profiles stored in the computer operating system/database. Alternatively, the tubular profile may be scanned as a part of field operations, where the tubular is scanned and the profile saved.
(2) A radio frequency identification tag (RFID tag) is affixed to the tubular, and the RFID tag contains identifying information regarding the corresponding pipe profile. This information is then fed to the operating system, to configure the system to identify the profile and position the power tong/backup unit appropriately. The RFID tag may include various other information regarding the tubular/tubular connection. FIG. 12 shows an RFID reader in schematic form.
(3) Automatic selection of appropriate pipe profile: the system scans the pipe profile and compares the shape or "signature" of same to the portfolio of pipe profiles stored in the system, and a match between the scanned profile and a stored profile is made, and that information is fed to the positioning system to configure the system for the proper positioning of the power tong.

As discussed elsewhere herein, the present invention comprises tubulars in which a specific "marker" have been installed, which may be any material with a conductivity greatly different from the underlying base tubular material, e.g. stainless steel. The marker may take the form of a stainless steel ring positioned at a known distance from the connection face. FIG. 12 is a schematic of a tubular comprising a marker 200. Marker 200 is preferably disposed at a known spacing (denoted as "X" in FIG. 12) from the connection face or any other target attribute, therefore once the location of marker 200 is known, the distance which the power tong/backup unit must be moved, to place it properly about the connection seam/face, is also known. An RFID tag 210, described in more detail herein, is also shown in FIG. 12.

Use of Pipe Profile Information to Monitor Tool Joint/Tubular Condition Over Time Yet another aspect and application of the invention disclosed herein is the ongoing monitoring of tool joint and other condition of tubulars. As can be readily understood from the foregoing description, the shape and dimensions of the tool joint/tubular is monitored and an ongoing log compared by the system with each trip through the rotary of the drilling rig. Via eddy current technology, the present system scans the overall tubular, including the tool joint and hard band and other features thereon, e.g. identification grooves and the like. The scanned and stored information regarding the tubular connections while the tubular string is being run into the hole is compared to the same information captured as the tubular string is being pulled from the hole (a connection-by-connection comparison). Subsequent measurements could be taken over multiple trips into/out of the hole to determine changes over time. As can be readily understood, such information would illustrate wear of the tubulars over time. As discussed elsewhere herein, the use of an RFID tag comprising additional tubular information such as serial number, dimensional information, prior use information, etc. is encompassed within the present invention.

It is further noted that the present system may comprise the function of identifying threaded tubular connections which are not torqued to proper specifications. The response from a properly torqued connection seam is different from a non-properly torqued connection seam, and this response or signal difference is measurable with the present system, hence the system can comprise an alarm to give the operator notice of such connections.

Use of Marker, Identifying Tag on Tubular

Yet another aspect of the present invention comprises the use of an identifying tag, which may comprise a Radio Frequency Identification or "RFID" tag, or similar tag, which is mounted on the connection, wither on the box or pin end of a tool joint upset. It is known in the art to use such tags, mounted on drill pipe, to store and provide information regarding the identity (e.g. serial number of a joint of drill pipe, dimensions of tube/tool joint, type of connection, etc.) and usage history of drill pipe. Other information may be referenced as well. The information stored on the tag is read by a reader (RFID tag sensor), known in the art. As noted above, FIG. 12 shows an exemplary RFID tag and tag reader. The present invention may use any other information which may be stored in the RFID tag.

The marker 200, as described above, may be any material which yields a highly contrasting eddy current response, and which is placed at a known distance from the connection face. When marker 200 is detected, power tong/backup unit may be moved the known distance as required to position it correctly about the connection seam.

Other Possible Attributes of the Present System

It is to be understood that the present system may comprise other attributes. While information related to tubular strings, connections therein, etc. could be captured and stored on local storage media and an RFID chip (positioned on the tubular), the present invention contemplates simultaneously storing same on a cloud server, for access by authorized users for analytical and remote monitoring, for maintenance, logistics and other needs.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof. For example, various types of probes and/or coils can be used in the positioning system; the eddy current profile may be enhanced by the intentional placement of easily identifiable markers on the tubular; the system may be used on drill pipe, tubing (such as production tubing or "work strings"), or casing; the system comprises the use of readily detectable markers having conductivity values significantly different from that of the underlying tubular, e.g. stainless steel, aluminum, etc., the marker being placed on the tubular; and the use of RFID tags containing tubular information, all to better position the power tong on the tubular.

Therefore, the scope of the invention is to be determined not by the illustrative examples set forth above, but by appended claims and their legal equivalents.

We claim:

1. A system for positioning a power tong unit at a desired position along the longitude of an electrically conductive tubular, comprising:
    a) an electric coil operatively connected to a source of electric current, thereby creating an electro-magnetic field therearound, said electric coil adapted to be placed radially with respect to and sufficiently close to an electrically conductive tubular so that said electro-magnetic field is influenced by the presence of said tubular, wherein said electric coil is mounted in a fixed vertical position, and wherein relative movement between said tubular and said electric coil results from vertical movement of said tubular while said electric coil remains vertically fixed and at a substantially constant distance from an outer surface of said tubular;
    b) a means for detecting a change in said electro-magnetic field of said electric coil in response to movement of said electric coil in a direction parallel to the longitude of said tubular, said means for detecting comprising a digital processor, and wherein said change in said electro-magnetic field comprises a change in at least one of impedance, current, and phase angle of said electric current and wherein said change results from a plurality of attributes of said tubular within said electro-magnetic field, said change comprising data from which a position of said connection end may be determined;
    c) a power tong unit, comprising a power tong and/or a backup unit;
    d) a means for positioning said power tong unit at a desired position along a line parallel to the longitude of said tubular, said means for positioning operatively coupled to said means for detecting a change in said electro-magnetic field of said electric coil, and thereby positioning said power tong unit at a desired position relative to said connection end in response to a said change in said electro-magnetic field of said electric coil;
    e) a portfolio of surface profile attributes, stored in a database, detectable by evaluation of impedance data from said coil, wherein said surface profile attributes include those not attributable to a connection end or other defined attribute of said tubular, and wherein said surface profile attributes may be distinguished from impedance data signifying said connection end or other defined attribute of said tubular, whereby said connection end may be identified with greater accuracy by said distinction and said power tong/backup unit positioned accordingly relative to said connection end or other defined attribute of said tubular, by movement of said power tong/backup unit or said tubular.

2. A system for placement of a power tong unit at a desired position along the longitude of an electrically conductive tubular, comprising:

a) an electric coil operatively connected to a source of electric current, thereby creating an electro-magnetic field therearound, said electric coil adapted to be placed radially with respect to and sufficiently close to an electrically conductive tubular so that said electro-magnetic field is influenced by the presence of said tubular, wherein said electric coil is mounted in a fixed vertical position, and wherein relative movement between said tubular and said electric coil results from vertical movement of said tubular while said electric coil remains vertically fixed and at a substantially constant distance from an outer surface of said tubular;

b) a means for detecting a change in said electro-magnetic field of said electric coil in response to movement of said electric coil in a direction parallel to the longitude of said tubular, said means for detecting comprising a digital processor, and wherein said change in said electro-magnetic field comprises a change in at least one of impedance, current, and phase angle of said electric current and wherein said change results from a plurality of attributes of said tubular within said electro-magnetic field, said change comprising data from which a position of said connection end may be determined;

c) a power tong unit, comprising a power tong and/or a backup unit, positioned at a fixed vertical position;

d) a means for vertically positioning said tubular, said means for positioning said tubular operatively coupled to said means for detecting a change in said electro-magnetic field of said electric coil, and thereby positioning said connection end of said tubular at a desired position relative to said power tong unit, in response to a said change in said electro-magnetic field of said electric coil;

e) a portfolio of surface profile attributes, stored in a database, detectable by evaluation of impedance data from said coil, wherein said surface profile attributes include those not attributable to a connection end or other defined attribute of said tubular, and wherein said surface profile attributes may be distinguished from impedance data signifying said connection end or other defined attribute of said tubular, whereby said connection end may be identified with greater accuracy by said distinction and said power tong/backup unit positioned accordingly relative to said connection end or other defined attribute of said tubular, by movement of said power tong/backup unit or said tubular.

* * * * *